(12) United States Patent
Liu et al.

(10) Patent No.: US 11,480,654 B2
(45) Date of Patent: Oct. 25, 2022

(54) RADAR TRANSCEIVER

(71) Applicant: Stichting IMEC Nederland, Eindhoven (NL)

(72) Inventors: Yao-Hong Liu, Eindhoven (NL); Marco Mercuri, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 327 days.

(21) Appl. No.: 16/789,757

(22) Filed: Feb. 13, 2020

(65) Prior Publication Data
US 2020/0264271 A1 Aug. 20, 2020

(30) Foreign Application Priority Data

Feb. 15, 2019 (EP) .................................... 19157470

(51) Int. Cl.
| | | |
|---|---|---|
| *G01S 7/03* | (2006.01) | |
| *G01S 7/34* | (2006.01) | |
| *G01S 13/12* | (2006.01) | |
| *G01S 13/58* | (2006.01) | |

(52) U.S. Cl.
CPC ............. *G01S 7/034* (2013.01); *G01S 7/34* (2013.01); *G01S 13/12* (2013.01); *G01S 13/581* (2013.01)

(58) Field of Classification Search
CPC . G01S 7/034; G01S 7/34; G01S 13/12; G01S 13/581
See application file for complete search history.

(56) References Cited

U.S. PATENT DOCUMENTS

| | | | |
|---|---|---|---|
| 10,097,287 B1* | 10/2018 | Schat | H04B 17/19 |
| 2003/0011413 A1* | 1/2003 | Masleid | G06F 1/10 |
| | | | 327/165 |
| 2013/0169468 A1 | 7/2013 | Johnson et al. | |
| 2018/0059233 A1* | 3/2018 | DiPoala | G01S 13/56 |

FOREIGN PATENT DOCUMENTS

| | | | |
|---|---|---|---|
| NO | 2013147948 A2 | 10/2013 | |
| WO | WO-2013147948 A2 * | 10/2013 | G01S 13/0209 |

OTHER PUBLICATIONS

Search Report, European Patent Application No. 19157470.6, dated Sep. 25, 2019, 7 pages.

* cited by examiner

*Primary Examiner* — Peter M Bythrow
*Assistant Examiner* — Nazra Nur Waheed
(74) *Attorney, Agent, or Firm* — McDonnell Boehnen Hulbert & Berghoff LLP

(57) ABSTRACT

Example embodiments relate to radar transceivers. One embodiment includes a radar transceiver. The radar transceiver includes a chirp generator for generating a chirp having an initial frequency and a final frequency. The radar transceiver also includes a controllable variable gain amplifier having an input connected to an output of the chirp generator. Further, the radar transceiver includes a control unit connected to a control input on the chirp generator and to a control input on the controllable variable gain amplifier. The control unit is adapted to output a first control signal to the chirp generator such that the chirp generator starts generating the chirp. The control unit is also adapted to output a second control signal to the controllable variable gain amplifier such that the controllable variable gain amplifier starts increasing an amplification in the controllable variable gain amplifier from a first amplification level to a second amplification level.

17 Claims, 5 Drawing Sheets

RADAR TRANSCEIVER

CROSS-REFERENCE TO RELATED APPLICATIONS

The present application is a non-provisional patent application claiming priority to European Patent Application No. EP 19157470.6, filed Feb. 15, 2019, the contents of which are hereby incorporated by reference.

FIELD OF THE DISCLOSURE

The present disclosure generally relates to radar transceivers in the field of remote vital signs and occupancy detection in smart home/building applications, and in particular to respecting the radar frequency power spectrum density (PSD) regulations at a minimum power consumption, without compromising performance.

BACKGROUND

Because radar sensors provide superior privacy preservation and robustness to ambient light conditions, they are often used over cameras in the field of remote vital signs and occupancy detection in smart home/building applications. Indoor use of radars is, however, subject to tough regulations on peak, sideband, and average power spectrum density (PSD). Moreover, depending on the building type and location, mains power is not always available, or may make the installation more costly, and thus battery-powered options may be used. Such an installation should not compromise performance properties in order to maintain precision on range and vital sign information.

State-of-the-art remote vital-sign sensors typically use an impulse-radio ultra-wideband (IR-UWB) radar because of its range resolution properties. However, it is challenging for IR-UWB radars to fulfill the side lobe PSD regulations without compromising detection distance. In addition, their power consumption is normally too high for long-term maintenance-free battery-powered operation.

Another approach is to use Frequency-modulated continuous wave (FMCW) radars. In this type of radar, the frequency is continuously and periodically swept from a start frequency to an end frequency, e.g. using chirp frequency generation. Once the sweep is completed, i.e. a chirp has been generated, the frequency is returned to the start frequency to begin the subsequent sweep. An alteration of the FMCW techniques is the so called pulsed FMCW, in which the pulse repetition interval is much longer than the actual frequency sweep time, providing some time in between the frequency sweeps in which the frequency is not swept.

With an FMCW radar, low sideband emission is normally achieved. However, in comparison with the IR-UWB, an FMCW radar with a similar detection distance would still violate the UWB average PSD requirement, due to its continuous operation. In addition, the continuous operation causes high power consumption. With a pulsed FMCW it would be possible to switch off the transmitter in between the frequency sweeps/chirps in order to lower the power consumption. However, switching the transmitter, or parts of the transmitter on and off in relation to the generation of the chirps may introduce frequency content in the side lobes, again violating the side lobe PSD regulations.

SUMMARY

In view of the above, the disclosure provides a radar transceiver that complies with the PSD regulations, with reduced power consumption, and without compromising performance.

According to a first aspect, the present disclosure describes a radar transceiver. The radar transceiver comprises a chirp generator for generating a chirp having an initial frequency, $f_0$, a final frequency, $f_1$. The radar transceiver comprises a controllable variable gain amplifier having an input connected to an output of the chirp generator. The radar transceiver comprises a control unit connected to a control input on the chirp generator, and to a control input on the controllable variable gain amplifier, wherein the control unit is adapted to output a first control signal to the chirp generator such that the chirp generator starts generating the chirp, and to output a second control signal to the controllable variable gain amplifier such that the controllable variable gain amplifier starts increasing an amplification in the controllable variable gain amplifier from a first amplification level, $A_1$, along a slope, to a second amplification level, $A_2$. Furthermore, the control unit is adapted to output the first control signal and the second control signal such that the start of generating the chirp coincides with the start of the increase in amplification.

By the term "chirp generator" is here meant any unit, device, circuit, and/or element comprising an input for receiving a control signal, an output at which the chirp generator is adapted to provide an output signal, and as a response to the input signal, the frequency of the output signal starts to sweep from an initial frequency, $f_0$, to a final frequency, $f_1$. Given only as examples, the frequency sweep from $f_0$ to $f_1$ may follow, but is not limited to, a linear, polynomial, exponential, or logarithmic slope.

By the term "controllable variable gain amplifier" is here meant an amplifier with variable amplification, comprising a control input for receiving a digital or analog control signal to which the level of amplification in the amplifier is dependent on, a signal input for receiving a signal which is to be amplified, and an output adapted to provide a signal that contains the essential waveform features of the input signal but with a larger amplitude, the amplitude being dependent on the amplification of the amplifier.

By the term "control unit" is here meant any unit, device, circuit, and/or element comprising one or more outputs that is capable of sending control signals or instructions to one or more devices in an electrical system, and using these control signals, control operation parameters of these devices. By way of example, the control unit may be implemented using a general purpose processor, an FPGA or ASIC, which is integrated together with the rest of circuitry of the radar transceiver, or provided as a separate unit.

In the manner described above the amplification level is only high during the chirp when necessary. As the amplification is increased gradually along a slope the side lobe energy in the spectrum is minimized. This should be compared to if the amplification is suddenly switched from a low level to a high level, which would increase the side lobe energy and violate the PSD regulations. As the increase of the amplification level is started simultaneously with the start of the chirp, compliance with the PSD regulations is again ensured. If the increase of the amplification were to be started before the start of the chirp, e.g. to make sure that the amplification has reached its high level $A_2$ once the chirp is started, a spur would be introduced in the spectrum, again violating the PSD regulations. By the present arrangement a radar transceiver with a high TX amplification only when required, and with power spectral density that complies with the PSD regulations may be provided.

The chirp generator may be a digitally controlled oscillator, DCO.

The digitally controlled oscillator may be controlled by digital signals received at an input thereof to alter the frequency or other parameters of the oscillator.

By using a digitally controlled oscillator as a chirp generator, an easy and convenient way of creating a chirp via digital control signals is provided since the frequency shift of the chirp may be easily controlled via the input signals. The input signals may be provided in serial or parallel form. The digitally controlled oscillator may be integrated together with the rest of circuitry of the radar transceiver, or provided as a separate unit.

The controllable variable gain amplifier may be a digitally controlled amplifier, DCA.

The digitally controlled amplifier may be controlled by external digital signals received at an input thereof to alter amplification or other parameters of the amplifier.

By using a digitally controlled amplifier as a controllable variable gain amplifier an easy and convenient way of controlling the amplification via a processor or other digital control logic is provided. The input signals may be provided in serial or parallel form. The digitally controlled amplifier may be integrated together with the rest of circuitry of the radar transceiver, or provided as a separate unit.

The chirp may end after a duration, $T_1$. Further, the control unit may be adapted to output the second control signal to the controllable variable gain amplifier such that the controllable variable gain amplifier starts decreasing the amplification in the controllable variable gain amplifier from the second amplification level, $A_2$, along a slope, to a third amplification level, $A_3$. This may be done such that the end of the chirp duration $T_1$ coincides with a time instant when the amplification in the controllable variable gain amplifier reaches the third amplification level, $A_3$.

In order to have high amplification only when required (thus when chirping), the amplification is lowered at the end of the chirp. If the amplification is decreased too early with respect to the end of the chirp, such that the amplification reaches its lower level $A_3$ prior to the end of the chirp, the radar bandwidth will be reduced, which will result in loss of radar range resolution. On the other hand, if the amplification is decreased too late with respect to the end of the chirp, such that the chirp ends prior to the amplification reaches its lower level $A_3$, a spur will be introduced in the spectrum, violating the PSD regulations.

By the present arrangement a radar transceiver maintaining power spectral density that complies with the PSD regulations, as well as maintaining full bandwidth, and thus maintaining the radar range resolution, may be provided.

The control unit may be adapted to output the first control signal such that a time duration, $T_2$, between the start of at least two consecutive chirps is greater than the chirp duration $T_1$.

Thus among two consecutive chirps the second chirp does not start immediately after the first one ends. After a chirp when the frequency has been swept from $f_0$ to $f_1$, the signal frequency returns to $f_0$ awaiting the start of the following chirp.

The pulsed behavior may allow for chirps to be produced non-continuously, in the sense that a subsequent chirp does not start immediately after a preceding chirp, but only as frequently as required for making a proper measurement. This in turn has the potential for reduced power consumption.

The controllable variable gain amplifier may have a first operating mode and a second operating mode, wherein the power consumption in the controllable variable gain amplifier is higher in the first mode than in the second mode. Further, the control unit may be adapted to set the controllable variable gain amplifier in the first mode before the start of the chirp duration $T_1$, and set the controllable variable gain amplifier in the second mode after the end of the chirp duration $T_1$.

That the power consumption is lower in the second mode means that the controllable variable gain amplifier is may be operating in a low power mode with a reduced power consumption. Alternatively, the controllable variable gain amplifier is switched off during the second mode. By this arrangement, a radar transceiver with a reduced power consumption is provided. In particular, in combination with the previously mentioned increase of amplification at the start of the chirp and the decrease of amplification at the end of the chirp, a radar transceiver with very low power consumption, and with power spectral density that complies with the PSD regulations is provided.

In one embodiment, the slope may be linear.

The use of a linear slope may allow for straightforward implementation. By way of example, one way of implementation may be that the control unit is a processor executing software code portions comprising enumeration loops or the like for creating signals representing a linear slope.

A time duration $T_3$, during which the amplification in the controllable variable gain amplifier increases from the first amplification level, $A_1$, to the second amplification level, $A_2$, may be in a range between 0% and 10% of the chirp time $T_1$.

The time duration $T_3$, of the increases in amplification level, may be adjusted such that the sidelobe energy does not violate PSD regulations. For very low values of the time duration $T_3$ (i.e. the range is close to 0%), an increase in the sidelobe energy which would violate the PSD regulations may occur. If the time duration $T_3$, of the increases in amplification level, is longer than 10% of the chirp time $T_1$, the radar bandwidth will be reduced, which will result in loss of radar range resolution.

By the present arrangement a radar transceiver maintaining power spectral density that complies with the PSD regulations, as well as maintaining full bandwidth, and thus maintaining the radar range resolution, may be provided.

A time duration $T_4$, during which the amplification in the controllable variable gain amplifier decreases from the second amplification level, $A_2$, to the third amplification level, $A_3$, may be in a range between 0% and 10% of the chirp time $T_1$.

The time duration $T_4$, of the decreases in amplification level, may be adjusted such that the sidelobe energy does not violate PSD regulations. For very low values of the time duration $T_4$ (i.e. the range is close to 0%), an increase in the sidelobe energy which would violate the PSD regulations may occur. If the time duration $T_4$, of the decreases in amplification level, is longer than 10% of the chirp time $T_1$, the radar bandwidth will be reduced, which will result in loss of radar range resolution.

By the present arrangement a radar transceiver maintaining power spectral density that complies with the PSD regulations, as well as maintaining full bandwidth, and thus maintaining the radar range resolution, may be provided.

The radar transceiver may comprise receiver circuitry adapted to operate in a first operating mode and a second operating mode, wherein the power consumption in the receiver circuitry is higher in the first mode than in the second mode. Further, the control unit may be adapted to set the receiver circuitry in the second mode after the end of the chirp duration $T_1$.

The receiver circuitry is adapted to receive transmitted radar signals that has been reflected on a target and returned to the transceiver. The receiver circuitry may amplify and demodulate the received RF-signals. The receiver circuitry may provide signals on the output for further processing.

The second mode of the receiver circuitry may be a low power mode. Alternatively, the receiver circuitry is switched off during the second mode. By the present arrangement a radar transceiver with low power consumption may be provided.

The control unit may be adapted to receive an input signal representative of a presence or a velocity of an object within a detection range of the radar transceiver, wherein the control unit is adapted to adjust the time duration $T_2$ based on the received input signal.

The input signal to the control unit may comprise information, such as velocity or presence of an object in front of the transceiver. In order to obtain an input signal representative of the velocity of an object in front of the transceiver, Doppler information may be extracted from the RX output of the transceiver. In order to obtain an input signal representative of a presence of an object within a detection range of the radar transceiver, range information may be extracted from the RX output of the radar transceiver.

By the present arrangement a radar transceiver with even further reduced power consumption may be provided since the control unit may adjust the time duration $T_2$ to be longer when a velocity of an object is low or when no object is detected compared to when a velocity of a detected object is high.

According to a second aspect of the disclosure, a method for implemented in a radar transceiver is provided. The embodiments disclosed below may be analogous to the transceiver disclosed above.

The method comprises starting generation of a chirp, using a chirp generator, simultaneously starting amplification, using an amplifier, of the chirp at a first amplification level $A_1$, and increasing the amplification of the chirp from the first amplification level, $A_1$, along a slope, to a second amplification level, $A_2$, during at least a portion of a time interval during which the chirp is generated.

The chirp may end after a duration, $T_1$. Subsequent to reaching the second amplification level $A_2$, the method may comprise starting to decrease the amplification level along a slope to a third amplification level, $A_3$, such that the end of the chirp duration $T_1$ coincides with a time instant when the amplification level reaches the third amplification level, $A_3$.

The method may comprise generation of consecutive chirps, such that a time duration, $T_2$, between the start of at least two consecutive chirps is greater than the chirp duration $T_1$.

The method may comprise setting the controllable variable gain amplifier in a first mode before the start of the chirp duration $T_1$, and setting the controllable variable gain amplifier in a second mode after the end of the chirp duration $T_1$. The power consumption in the controllable variable gain amplifier may be higher in the first mode than in the second mode.

In one embodiment of the method the slope may be linear.

The method may comprise a time duration $T_3$, during which the amplification in the controllable variable gain amplifier increases from the first amplification level, $A_1$, to the second amplification level, $A_2$, is in a range between 0% and 10% of the chirp time $T_1$.

Effects and features of the second aspects are largely analogous to those described above in connection with the first aspect. Embodiments mentioned in relation to the first aspect are largely compatible with the second aspect. It is further noted that the inventive concepts relate to all possible combinations of features unless explicitly stated otherwise.

Other features of example embodiments will appear from the following detailed disclosure, the claims, and the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional features, will be better understood through the following illustrative and non-limiting detailed description of example embodiments, with reference to the appended drawings, where the same reference numerals will be used for similar elements.

DETAILED DESCRIPTION

Figure 1:
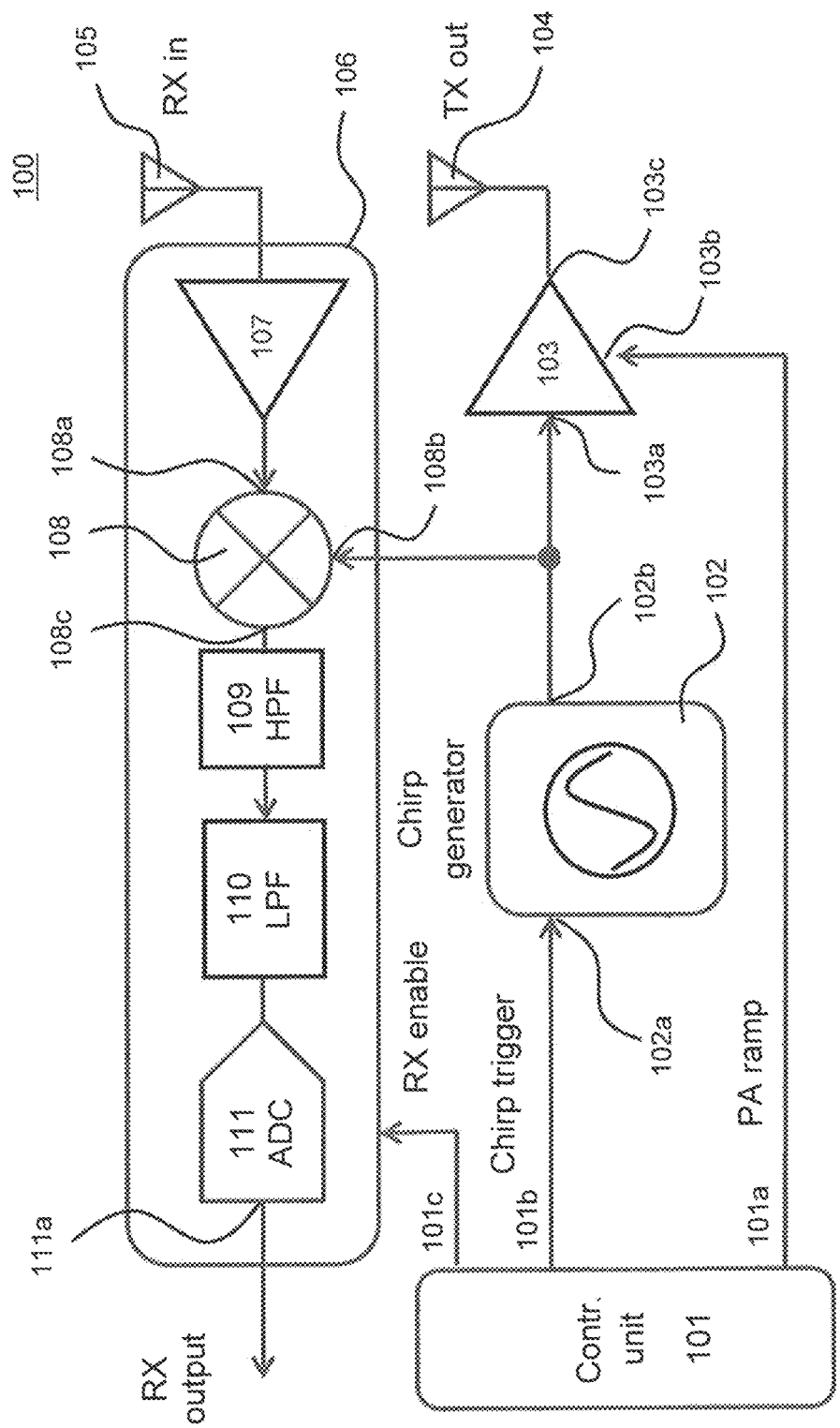
FIG. 1 is a schematic block diagram of a transceiver, according to example embodiments.

FIG. 1 illustrates a radar transceiver 100 according to example embodiments. A control unit 101, comprising a number of outputs 101a-101c, generates control signals to control the operation of other components in the transceiver 100. The control signals can be, but are not limited to, trigger pulses, enable signals, and/or ramp signals. According to different embodiments, the control unit 101 can be a chirp finite-state-machine, FSM, a processor with software code portions for generating control signals, or any other type of device suitable for generating control signals.

A chirp generator 102, comprising an input 102a and an output 102b, receives the control signals provided at output 101b from the control unit at the input 102a. As a response to receiving a signal at the input 102a, the chirp generator 102 generates a frequency chirp having an initial frequency, $f_0$, and a final frequency, $f_1$, and provides it at the output 102b. According to example embodiments, the chirp generator 102 is based on a digitally controlled oscillator, DCO. In order to provide a chirp with a well-defined frequency spectrum, the DCO may be first locked to an initial frequency $f_0$ by a frequency-locked loop, FLL. At the start of the chirp, the loop is opened, and the DCO frequency starts to chirp to the targeted final frequency $f_1$.

The output 102b of the chirp generator 102 is forwarded to a controllable variable gain amplifier 103. The controllable variable gain amplifier 103, comprising a signal input 103a and a control input 103b and an output 103c, receives the output 102b from the chirp generator 102 at the signal input 103a. The level of amplification in the controllable variable gain amplifier 103, at which the signal received at the first input 103a is amplified and sent out at the output 103c, can be varied and controlled by sending a signal to the control input 103b.

A control signal is sent from the output 101a of the control unit 101 to the control input 103b of the controllable variable gain amplifier 103. As a response to the signal received at control input 103b, the controllable variable gain amplifier 103 starts increasing the amplification from a first amplification level, $A_1$, along a slope, to a second amplification level, $A_2$. According to example embodiments, the control unit 101 is adapted to output the control signal at output 101b to the chirp generator 102 and the control signal at output 101a to the controllable variable gain amplifier 103 such that the start of generating the chirp coincides with the start of the increase in amplification.

According to one embodiment, the control unit 101 is further adapted to send a control signal from output 101a of the control unit 101 to the control input 103b of the controllable variable gain amplifier 103, such that the controllable variable gain amplifier 103 starts decreasing the amplification from the second amplification level, $A_2$, along a slope, to a third amplification level, $A_3$. This may be done such that the end of the chirp (i.e. when the frequency at the output 102b of chirp generator 102 has reached frequency $f_1$) coincides with a time instant when the amplification in the controllable variable gain amplifier 103 reaches the third amplification level, $A_3$. The amplification levels $A_1$ and $A_3$ may be different. However, in some embodiments, $A_1$ and $A_3$ are equal. In addition, in some embodiments, $A_1$ and $A_3$ are equal to zero.

According to some embodiments, the controllable variable gain amplifier 103 is a digitally controlled amplifier, DCA. The control signals received at the control input 103b may be in serial or parallel form. The signals may be binary coded or coded in any other format suitable for controlling the amplification in the DCA.

According to some embodiments, the controllable variable gain amplifier 103 is an analog voltage or current controlled amplifier. The control signals received at the control input 103b may in this case be a voltage or current signal suitable for controlling the amplification in the amplifier.

The amplified output 103c signal from the controllable variable gain amplifier 103 is forwarded to a transmitting antenna 104, from which the amplified chirp signal is transmitted as a radar signal.

The transmitted radar signal is reflected on a target and returned to transceiver where the returning signal is picked up by a receiving radar antenna 105. From the receiving antenna 105, the signal is forwarded to a receiver circuitry 106. According to an embodiment, the receiver circuitry comprises a low-noise amplifier, LNA, 107, a frequency mixer 108, a high-pass filter, HPF, 109, a low-pass filter, LPF, 110, and an analog-to-digital convertor, ADC, 111 for digitization.

The signal from the receiving radar antenna 105 is received at the input of a low-noise amplifier 107. At the low-noise amplifier 107, the signal is amplified in order to provide a signal of a sufficient amplitude for the subsequent components of the receiver circuitry 106.

A frequency mixer 108, comprising a first 108a and a second 108b input and an output 108c, receives the output from the low-noise amplifier 107 at its first input 108a. The chirp signal sent from the chirp generator 102 to the controllable variable gain amplifier 103 is also sent to the frequency mixer 108 and received at the second input 108b. As the signal received by the receiving radar antenna 105 may be Doppler shifted with respect to the signal originally transmitted by the transmitting antenna 104, the mixer outputs the difference between the two frequencies received at the inputs 108a and 108b.

The output 108c of the frequency mixer 108 is forwarded to a high-pass filter, HPF, 109. The HPF 109 suppresses interfering signals of low frequency in the input signal. Typically, these interfering signals originate from leakage between transmitter and receiver, or DC components.

The output of the HPF 109 is forwarded to a low-pass filter, LPF, 110. The LPF 110 suppresses unwanted high frequency noise and interference in the input signal. Typically, these interfering signals are higher order harmonics.

An analog-to-digital converter, ADC, 111 receives the output signal from LPF 110. The ADC is used for digitization of the signal and sends the digital signal to the output 111a for further processing.

Figure 2:
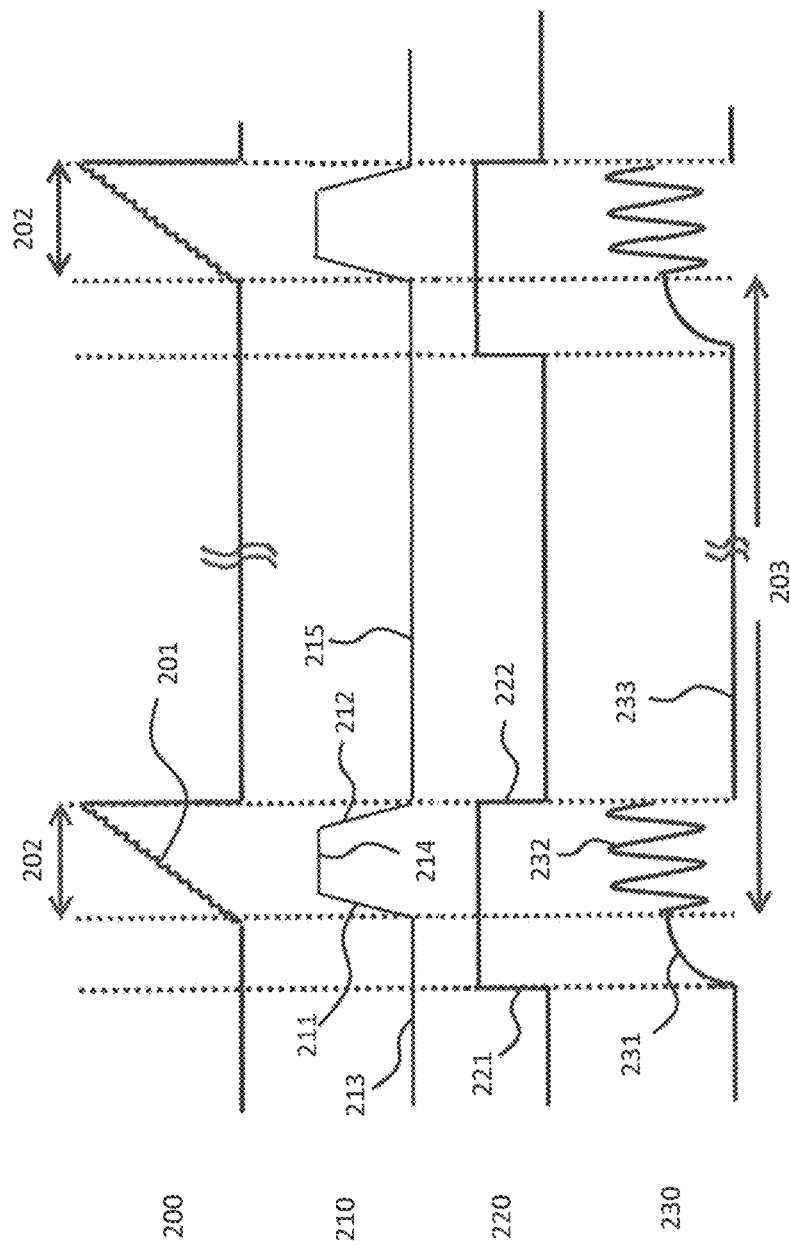
FIG. 2 diagrammatically illustrates timing signals for the transceiver in FIG. 1, according to example embodiments.

FIG. 2 shows a wave illustration in time domain of signals present in a radar transceiver 100, according to example embodiments. The four graphs illustrate the following waves as a function of time; the output frequency 200 from the chirp generator 102, the amplification level 210 in the controllable variable gain amplifier 103, the receiver circuitry RX enable signal 220, and the receiver circuitry RX output signal 230 after signal digitization/demodulation.

The first graph illustrates the output frequency 200 from the chirp generator 102 as a function of time. The output frequency is set to $f_0$ (the base line in the signal 200) prior to the start of the chirp 201. When the control unit 101 initiates the start of the chirp by sending a control signal at the output 101b to the input 102a of the chirp generator, the frequency chirp 201 starts and the frequency is swept from the initial frequency, $f_0$, to the final frequency, $f_1$ (at the top of the stepped curve in FIG. 2). According to example embodiments, the chirp 201 last for a time duration, $T_1$, 202, after which the output frequency returns to the initial frequency $f_0$.

According to some embodiments, a time $T_2$, 203, is allowed to lapse between the start of two consecutive chirps. This is sometimes referred to as pulse repetition interval, PRI). In some embodiments, the PRI 203 is greater than the chirp duration time. Thus $T_2 > T_1$, meaning that the chirp generator 102 is not continuously chirping, but is instead duty-cycled to pulsed chirp operation.

The second graph illustrates the amplification level 210 in the controllable variable gain amplifier 103 as a function of time. When the control unit 101 initiates the start of the chirp, the control unit 101 also sends a signal to the controllable variable gain amplifier 103. As a response, the amplification 210 in the controllable variable gain amplifier 103 starts increasing from a first amplification level, $A_1$, 213 along a slope 211, to a second amplification level, $A_2$, 214. The control unit 101 is adapted to output control signals such that the start of the chirp coincides with the start of the increase in amplification as indicated by the dashed line in FIG. 2.

According to an embodiment, the amplification level 210 in the controllable variable gain amplifier 103 decreases at the end of the chirp duration, $T_1$, 202 from the second amplification level, $A_2$, 214 along a slope 212, to a third amplification level, $A_3$, 215. This is done such that the end of the chirp duration, $T_1$, 202 coincides with a time at which the amplification 210 in the controllable variable gain amplifier 103 reaches the third amplification level, $A_3$, 215 as indicated by the dashed line in FIG. 2. In some embodiments, the amplification slopes 211, 212 follow a linear shape (i.e. a straight line). However, the slopes 211, 212 are not limited to follow a linear shape, but may follow also a polynomial, exponential, logarithmic, or any other shape.

As previously mentioned, the amplification levels $A_1$ 213 and $A_3$ 215 may be different. However, in some embodiments amplification levels $A_1$, 213 and $A_3$, 215 are both equal to zero. After the end of the chirp duration, $T_1$, 202, the amplification 210 has reached amplification level $A_3$ 215 and remains at this level until the start of the next frequency chirp.

The third graph illustrates the receiver circuitry RX enable signal 220 as a function of time. As shown in the graph, the receiver circuitry 106 is enabled 221 earlier than the controllable variable gain amplifier 103, according to one embodiment. This is to ensure that the receiver circuitry 106 has sufficient time to settle 231 the DC voltage prior to outputting the actual signal 232, as shown in the fourth graph, illustrating the receiver circuitry RX output signal 230 after signal digitization/demodulation. This settling behavior 231 is primarily due to the HPF 109 in the receiver circuitry 106. The higher the HPF 109 corner frequency, the shorter the settling time 231, but the further the subject should be away from the radar transceiver 100. At the end of the chirp, the receiver circuitry RX enable signal 220 disables 222 the receiver circuitry 106 again. As a result, the receiver circuitry RX output signal 230 returns to its lower level 233, awaiting the start of the next cycle.

The control unit 101 in the radar transceiver 100 may turn on the controllable variable gain amplifier 103 and the receiver circuitry 106 only during the chirp, so the radar is duty-cycled to meet power consumption, average and sidelobe PSD, and distance requirements. By way of example, a PM 203 of 1.3 ms can be chosen to capture fast movements of an indoor subject (e.g., sudden falling) with a Doppler velocity up to 7 m/s. With 0 dBm amplifier output power, a duty cycling factor may be less than 3% to meet the average PSD regulations, thus resulting in a 40 µs chirp time. All the radar circuits may be disabled outside the chirp duration 202, which significantly reduce the average power consumption by about a factor of 33.

Figure 3:
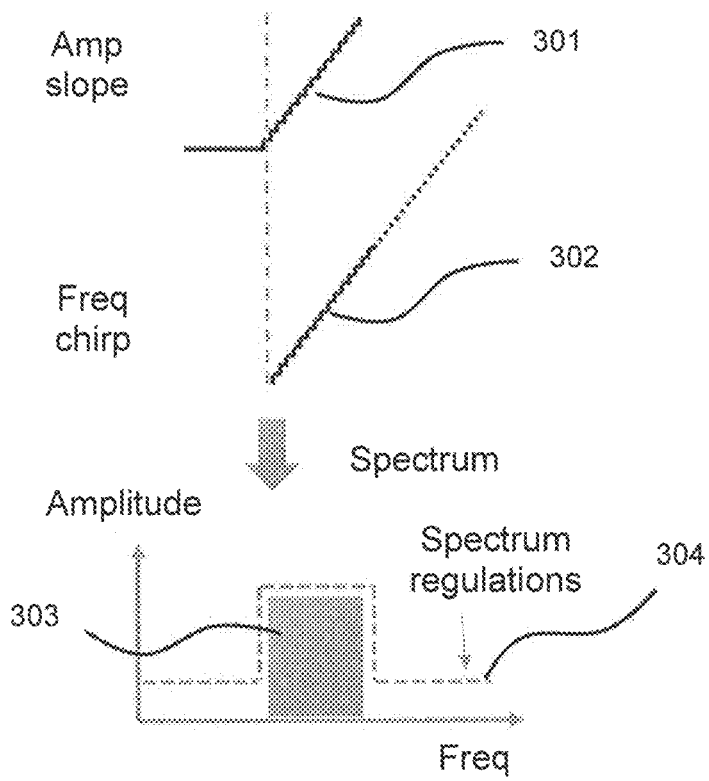
FIG. 3 diagrammatically illustrates timing signals for chirp generation, according to example embodiments.

FIG. 3 shows an illustration of the timing of the amplification slope 301 and the frequency chirp 302, together with the corresponding frequency spectrum 303, according to some embodiments. The amplification slope 301 starts simultaneously with the start of the frequency chirp 302. This timing results in a transmitted radar signal with the frequency spectrum indicated by reference 303. By this arrangement the sidelobe energy in the frequency spectrum 303 is minimized, and thus a frequency spectrum 303 that falls within the spectrum regulations 304 is achieved.

Figure 4:
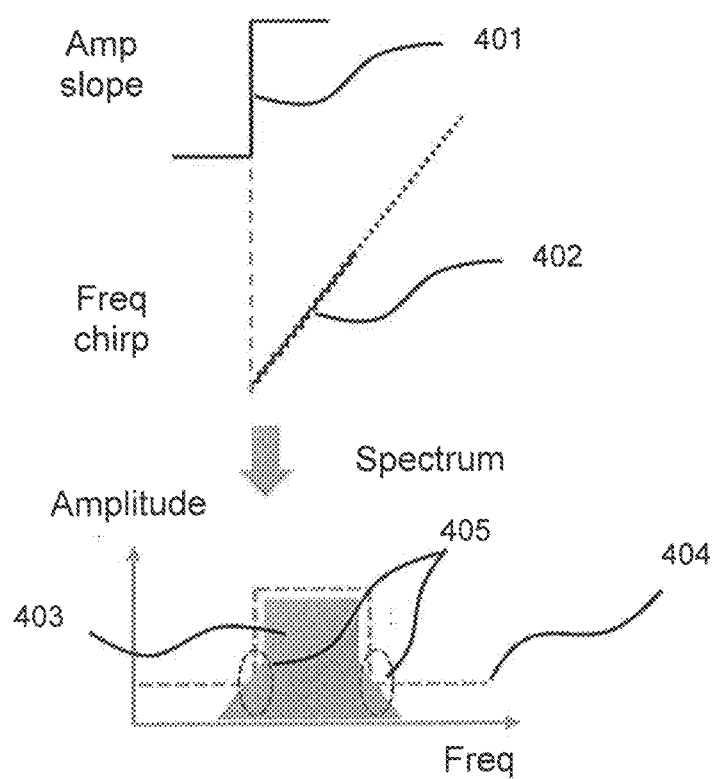
FIG. 4 diagrammatically illustrates timing signals for chirp generation, according to example embodiments.

FIG. 4 shows an illustration of the effects of using a step function 401 for increasing the amplification, instead of increasing the amplification along a slope. The amplification step 401 coincides with the start of the frequency chirp 402. By this arrangement the resulting frequency spectrum 403 suffers from increasing sidelobe energy 405 that may fall outside the spectrum regulations 404. Due to the possible violation of the spectrum regulations 404, this arrangement may be avoided.

Figure 5:
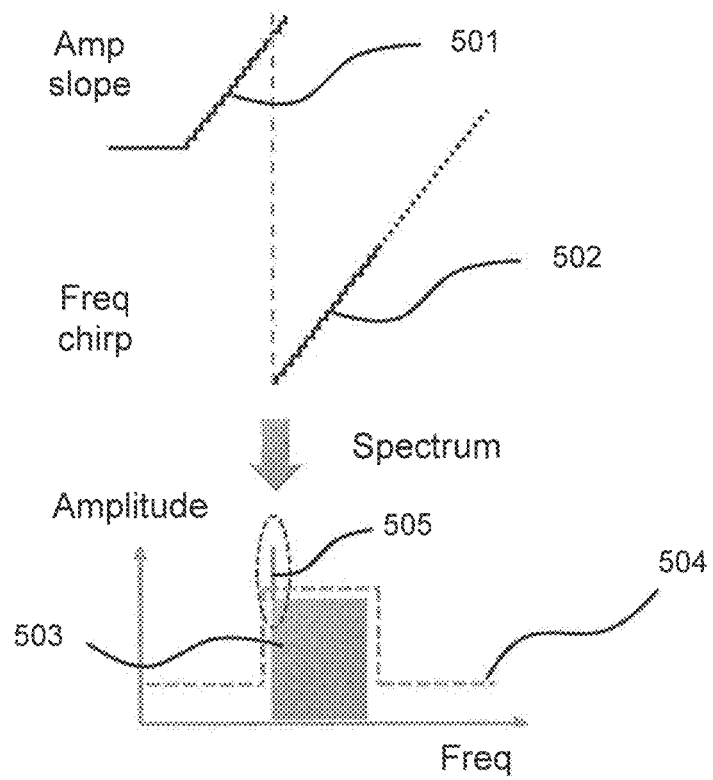
FIG. 5 diagrammatically illustrates timing signals for chirp generation, according to example embodiments.

FIG. 5 shows an illustration of the effect of starting the amplification slope 501 earlier than the start of the frequency chirp 502. In the present example the amplification slope 501 is started 1 µs earlier that the frequency chirp 502, however, the spectral effects discussed here are not limited to an amplification slope 501 advancement of 1 µs only, and should rather be seen as a result of any advancement of the amplification slope 501 with respect to the frequency chirp 502. Before the start of the frequency chirp 502, the frequency at the output 102b of the chirp generator 102 is at its lowest ($f_0$) awaiting the trigger for starting the chirp, as discussed earlier. Thus when the amplification slope 501 starts early, this low frequency content is being amplified early. This introduces a spur 505 in the lower part of the frequency spectrum 503 that falls outside the spectrum regulations 504. Due to the violation of the spectrum regulations 504, this arrangement may be avoided.

Figure 6:
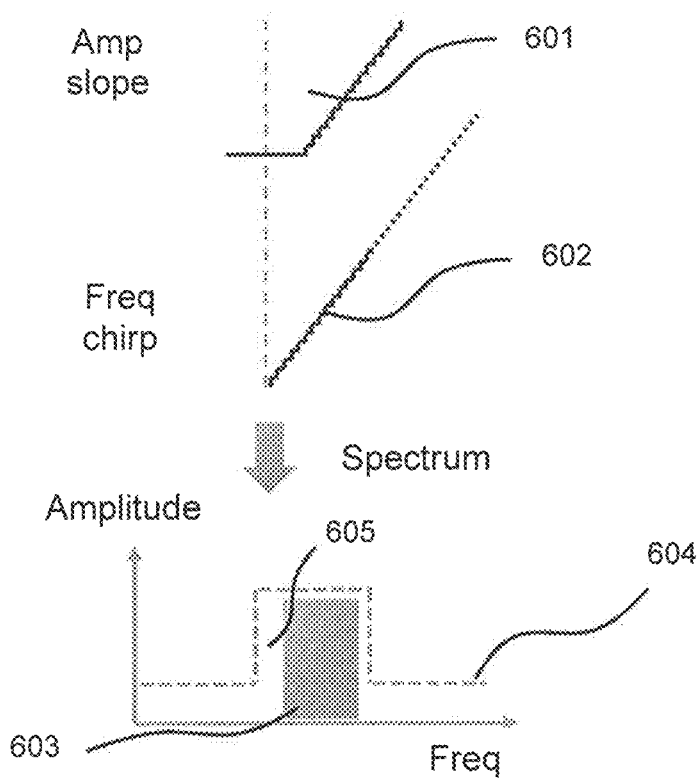
FIG. 6 diagrammatically illustrates timing signals for chirp generation, according to example embodiments.

FIG. 6 shows an illustration of the effect of starting the amplification slope 601 later than the start of the frequency chirp 602. When the amplification slope 601 is started later than the start of the frequency chirp, this initial, low frequency, part of the chirp is not amplified and thus not transmitted. This can be seen in the frequency spectrum 603 as a reduction of bandwidth 605 at the lower end of the frequency spectrum 603. By this arrangement the frequency spectrum is still in compliance with the spectrum regulations 604. However, the reduction of bandwidth causes degradation in radar range resolution. Degradation in radar range resolution may be an unwanted effect. As such, this arrangement may be avoided.

Figure 7:
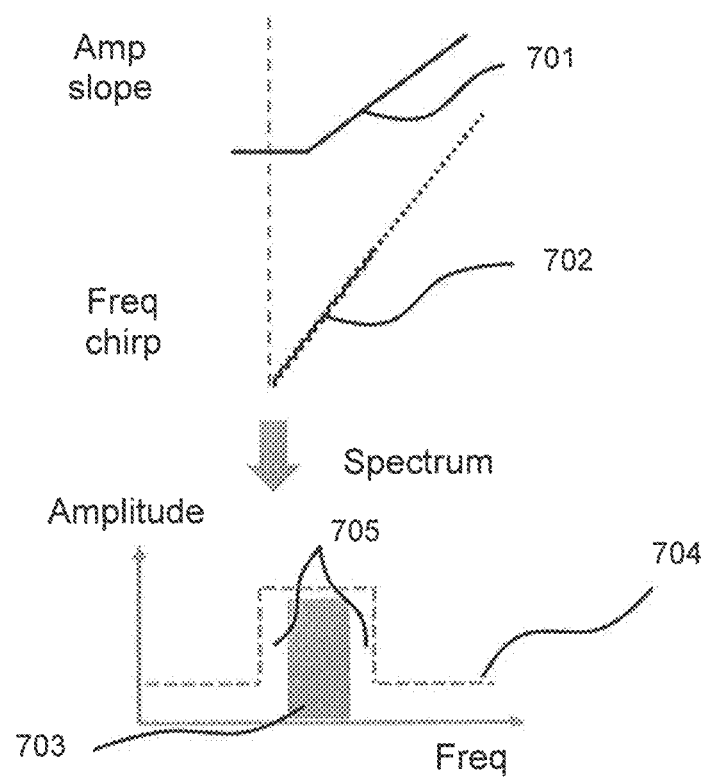
FIG. 7 diagrammatically illustrates timing signals for chirp generation, according to example embodiments.

FIG. 7 shows an illustration of the effect of a too slow amplification slope 701, compared to the duration of the frequency chirp 702. A too slow amplification slope 701 causes reduction of bandwidth 705 in the frequency spectrum 703. By this arrangement the frequency spectrum is still in compliance with the spectrum regulations 704. However, the reduction of bandwidth causes degradation in radar range resolution. Degradation in radar range resolution may be an unwanted effect and, as such, may be avoided. In order to avoid reduction of bandwidth, the time of the amplification slope 701 may be within the range of 0-10% of that of the frequency chirp 702. By way of example, the effects of some embodiments are achieved using a range for the amplification slope that is larger than 0% but, in some embodiments, not exceeding the chirp duration. The time of the amplification slope may hence, by way of example, be 1%, 2%, 3%, 4%, 5%, 6%, 7%, 8%, 9%, 10% or a higher percentage of the chirp time.

As has been shown above, the timing of the start of the amplification slope as well as the duration of the amplification slope with respect to the frequency chirp, have significant effect on the frequency spectrum transmitted from the radar transceiver. A very precise timing and duration will result in a frequency spectrum that is in compliance with the regulations and at the same time maintains bandwidth and thus radar range resolution.

The disclosure has mainly been described above with reference to a few embodiments. However, as is readily appreciated by a person skilled in the art, other embodiments than the ones disclosed above are equally possible within the scope of the disclosure, as defined by the appended patent claims.

What is claimed is:
1. A radar transceiver, comprising:
 a chirp generator for generating a chirp having an initial frequency and a final frequency;

a controllable variable gain amplifier having an input connected to an output of the chirp generator; and a control unit connected to a control input on the chirp generator and to a control input on the controllable variable gain amplifier, wherein the control unit is adapted to:

output a first control signal to the chirp generator such that the chirp generator starts generating the chirp;

output a second control signal to the controllable variable gain amplifier such that the controllable variable gain amplifier starts increasing an amplification in the controllable variable gain amplifier from a first amplification level, along a slope, to a second amplification level; and output the first control signal and the second control signal such that a start of generating the chirp coincides with a start of the increase in amplification.

2. The radar transceiver according to claim 1, wherein the chirp generator comprises a digitally controlled oscillator.

3. The radar transceiver according to claim 1, wherein the controllable variable gain amplifier comprises a digitally controlled amplifier.

4. The radar transceiver according to claim 1,
wherein the chirp ends after a chirp duration, and
wherein the control unit is further adapted to output the second control signal to the controllable variable gain amplifier such that the controllable variable gain amplifier starts decreasing the amplification in the controllable variable gain amplifier from the second amplification level, along a slope, to a third amplification level such that an end of the chirp duration coincides with a time at which the amplification in the controllable variable gain amplifier reaches the third amplification level.

5. The radar transceiver according to claim 4, wherein the control unit is further adapted to output the first control signal such that a time duration between a start of at least two consecutive chirps is greater than the chirp duration.

6. The radar transceiver according to claim 5,
wherein the controllable variable gain amplifier has a first operating mode and a second operating mode,
wherein a power consumption in the controllable variable gain amplifier is higher in the first operating mode than in the second operating mode, and
wherein the control unit is further adapted to set the controllable variable gain amplifier in the first operating mode before a start of the chirp duration and set the controllable variable gain amplifier in the second operating mode after an end of the chirp duration.

7. The radar transceiver according to claim 6, wherein the slope is linear.

8. The radar transceiver according to claim 7, wherein a time duration during which the amplification in the controllable variable gain amplifier increases from the first amplification level to the second amplification level is between 0% and 10% of the chirp duration.

9. The radar transceiver according to claim 8, wherein a time duration during which the amplification in the controllable variable gain amplifier decreases from the second amplification level to the third amplification level is between 0% and 10% of the chirp duration.

10. The radar transceiver according to claim 9,
wherein the radar transceiver comprises receiver circuitry adapted to operate in a first operating mode and a second operating mode,
wherein a power consumption in the receiver circuitry is higher in the first operating mode than in the second operating mode, and
wherein the control unit is further adapted to set the receiver circuitry in the second operating mode after an end of the chirp duration.

11. The radar transceiver according to claim 10, wherein the control unit is further adapted to:
receive an input signal representative of a presence or a velocity of an object within a detection range of the radar transceiver; and
adjust a time duration between a start of at least two consecutive chirps based on the received input signal.

12. A method implemented in a radar transceiver, comprising:
generating a chirp using a chirp generator;
simultaneously amplifying, using a controllable variable gain amplifier, the chirp at a first amplification level; and
increasing the amplification of the chirp from the first amplification level along a slope to a second amplification level during at least a portion of a time interval during which the chirp is generated.

13. The method according to claim 12,
wherein the chirp ends after a chirp duration, and
wherein the method further comprises decreasing, subsequent to reaching the second amplification level, the amplification along a slope to a third amplification level such that an end of the chirp duration coincides with a time instant at which the amplification reaches the third amplification level.

14. The method according to claim 13, further comprising generating consecutive chirps such that a time duration between a start of at least two consecutive chirps is greater than the chirp duration.

15. The method according to claim 14,
wherein the controllable variable gain amplifier has a first operating mode and a second operating mode,
wherein a power consumption in the controllable variable gain amplifier is higher in the first operating mode than in the second operating mode, and
wherein the method further comprises:
setting the controllable variable gain amplifier in the first operating mode before a start of the chirp duration; and
setting the controllable variable gain amplifier in the second operating mode after an end of the chirp duration.

16. The method according to claim 15, wherein the slope is linear.

17. The method according to claim 16, wherein a time duration during which the amplification in the controllable variable gain amplifier increases from the first amplification level to the second amplification level is between 0% and 10% of the chirp duration.

* * * * *